US012275917B2

(12) United States Patent
Drendel

(10) Patent No.: US 12,275,917 B2
(45) Date of Patent: Apr. 15, 2025

(54) SOLID TOILET-DEPOSITED COMPOSITION COMPRISING A POTASSIUM IODIDE/PINE TAR MIXTURE

(71) Applicant: Darla Rachel Drendel, Glendora, CA (US)

(72) Inventor: Darla Rachel Drendel, Glendora, CA (US)

( * ) Notice: Subject to any disclaimer, the term of this patent is extended or adjusted under 35 U.S.C. 154(b) by 0 days.

(21) Appl. No.: 18/429,359

(22) Filed: Jan. 31, 2024

(65) Prior Publication Data

US 2024/0254409 A1 Aug. 1, 2024

Related U.S. Application Data

(60) Provisional application No. 63/482,580, filed on Jan. 31, 2023.

(51) Int. Cl.

| | |
|---|---|
| ***C11D 1/28*** | (2006.01) |
| ***C11D 1/12*** | (2006.01) |
| ***C11D 3/04*** | (2006.01) |
| ***C11D 3/10*** | (2006.01) |
| ***C11D 3/40*** | (2006.01) |
| ***C11D 3/50*** | (2006.01) |

(52) U.S. Cl.

CPC .............. *C11D 1/126* (2013.01); *C11D 3/046* (2013.01); *C11D 3/10* (2013.01); *C11D 3/40* (2013.01); *C11D 3/50* (2013.01)

(58) Field of Classification Search

CPC ........... C11D 1/143; C11D 1/28; C11D 1/126; C11D 1/37; C11D 3/0052; C11D 3/0094; C11D 3/042; C11D 3/10; C11D 3/1233; C11D 3/126; C11D 3/382; C11D 3/48; C11D 3/50; C11D 7/08; C11D 7/12; C11D 7/44; C11D 9/44; C11D 13/08; C11D 9/444; C11D 17/0056; C11D 17/02; C11D 17/044; C11D 2111/14

See application file for complete search history.

(56) References Cited

U.S. PATENT DOCUMENTS

| | | | | |
|---|---|---|---|---|
| 5,895,781 | A * | 4/1999 | Neumiller ............ | C11D 3/2096 510/192 |
| 6,713,441 | B1 * | 3/2004 | DeSenna .............. | C11D 3/0052 422/5 |
| 2005/0130863 | A1 * | 6/2005 | Blagg ................ | C11D 17/0056 510/375 |
| 2017/0275563 | A1 * | 9/2017 | Federle .................... | C11D 3/48 |
| 2022/0064572 | A1 * | 3/2022 | Garcia Subirats ... | C11D 3/3707 |
| 2023/0050946 | A1 * | 2/2023 | Piorkowski .......... | C11D 3/3707 |
| 2023/0159857 | A1 * | 5/2023 | Valdes Vergara ........ | C11D 3/10 510/395 |

* cited by examiner

*Primary Examiner* — Charles I Boyer

(57) ABSTRACT

A toilet-deposited composition includes a water-activated toilet drop-in composition comprising an aggregate of components in solid form including at least one surfactant configured to clean the toilet surfaces, at least one neutralizing agent configured to neutralize urine, a fragrant agent configured to produce a fragrance when deposited in the water, and at least one sterilizing agent. The water-activated toilet drop-in is configured to be deposited in a bowl or a tank of a toilet.

14 Claims, 4 Drawing Sheets

SOLID TOILET-DEPOSITED COMPOSITION COMPRISING A POTASSIUM IODIDE/PINE TAR MIXTURE

RELATED APPLICATIONS

This application claims the benefit of U.S. Provisional Patent Application No. 63/482,580, filed Jan. 31, 2023, which is incorporated herein by reference in its entirety.

BACKGROUND

This disclosure relates generally to a composition and method of use of such. More specifically, this disclosure relates generally to a toilet-deposited composition. In addition, this disclosure relates generally to a water activated composition that is configured to be released into the water in the bowl of the toilet. This disclosure also relates generally to a water activated composition that is configured to be released into the water in the tank of the toilet.

Water waste associated with toilets is a significant environmental concern, particularly with inefficient or older toilets that many people use. Traditional toilets can use a substantial amount of water with each flush, contributing to unnecessary water consumption. In regions facing drought conditions or general water scarcity, unnecessary water consumption can become even more critical. With millions of households using these toilets daily, and a standard toilet using up to several gallons of water for each flush, the cumulative impact on water resources can be substantial. This may be compounded by the inefficiency of outdated toilet models, which may cause strains on local water supplies and may also lead to increased energy consumption in water treatment plants, further amplifying the environmental footprint.

Promoting the widespread adoption of these water-saving technologies is crucial for mitigating water waste associated with toilets. As such, a toilet-deposited composition is disclosed herein. The toilet-deposited composition includes a water-activated toilet drop-in composition comprising an aggregate of components in solid form including at least one surfactant configured to clean the toilet surfaces, at least one neutralizing agent configured to neutralize urine, a fragrant agent configured to produce a fragrance when deposited in the water, and at least one sterilizing agent. The water-activated toilet drop-in is configured to be deposited in a bowl or a tank of a toilet.

SUMMARY

The subject matter of the present application has been developed in response to the present state of the art, and in particular, in response to the problems and disadvantages associated with conventional compositions that have not yet been fully solved by currently available techniques. Accordingly, the subject matter of the present application has been developed to provide embodiments of a system, composition, and method that overcome at least some of the shortcomings of prior art techniques.

Disclosed herein is a toilet-deposited composition. The toilet-deposited composition includes a water-activated toilet drop-in composition comprising an aggregate of components in solid form including at least one surfactant configured to clean the toilet surfaces, at least one neutralizing agent configured to neutralize urine, a fragrant agent configured to produce a fragrance when deposited in the water, and at least one sterilizing agent. The water-activated toilet drop-in is configured to be deposited in a bowl or a tank of a toilet. The preceding subject matter of this paragraph characterizes example 1 of the present disclosure.

The water-activated toilet drop-in is configured to be deposited in the bowl of the toilet to reduce the need to flush the toilet. The preceding subject matter of this paragraph characterizes example 2 of the present disclosure, wherein example 2 also includes the subject matter according to example 1, above.

The neutralizing agent comprises sodium bicarbonate. The preceding subject matter of this paragraph characterizes example 3 of the present disclosure, wherein example 3 also includes the subject matter according to any one of examples 1-2, above.

The surfactant comprises Sodium Cocoyl Isethionate. The preceding subject matter of this paragraph characterizes example 4 of the present disclosure, wherein example 4 also includes the subject matter according to any one of examples 1-3, above.

The aggregate of components in solid form comprises potassium iodide. The preceding subject matter of this paragraph characterizes example 5 of the present disclosure, wherein example 5 also includes the subject matter according to any one of examples 1-4, above.

The aggregate of components in solid form further comprises at least one colorant configured to color the water. The preceding subject matter of this paragraph characterizes example 6 of the present disclosure, wherein example 6 also includes the subject matter according to any one of examples 1-5, above.

The aggregate of components in solid form comprises sodium cocoyl isethionate in a weight percent between 5% and 15%. The preceding subject matter of this paragraph characterizes example 7 of the present disclosure, wherein example 7 also includes the subject matter according to any one of examples 1-6, above.

The aggregate of components in solid form comprises sodium bicarbonate in a weight percent between 46% and 66%. The preceding subject matter of this paragraph characterizes example 8 of the present disclosure, wherein example 8 also includes the subject matter according to any one of examples 1-7, above.

The aggregate of components in solid form an inner aggregate of components and an outer aggregate of components, wherein the inner aggregate of components is configured to dissolve at a rate slower than the outer aggregate of components. The preceding subject matter of this paragraph characterizes example 9 of the present disclosure, wherein example 9 also includes the subject matter according to any one of examples 1-8, above.

The inner aggregate of components comprises a sterilizing agent comprising Potassium Iodide. The preceding subject matter of this paragraph characterizes example 10 of the present disclosure, wherein example 10 also includes the subject matter according to any one of examples 1-9, above.

The inner aggregate of components comprises Citric Acid. The preceding subject matter of this paragraph characterizes example 11 of the present disclosure, wherein example 11 also includes the subject matter according to any one of examples 1-10, above.

The water-activated toilet drop-in is configured to be deposited in the tank of the toilet. The preceding subject matter of this paragraph characterizes example 12 of the present disclosure, wherein example 12 also includes the subject matter according to any one of examples 1-11, above.

The surfactant comprises Sodium Lauroyl Lactylate. The preceding subject matter of this paragraph characterizes example 13 of the present disclosure, wherein example 13 also includes the subject matter according to any one of examples 1-12, above.

The surfactant comprises Pine Tar. The preceding subject matter of this paragraph characterizes example 14 of the present disclosure, wherein example 14 also includes the subject matter according to any one of examples 1-13, above.

The aggregate of components comprises a sterilizing agent comprising Potassium Iodide. The preceding subject matter of this paragraph characterizes example 15 of the present disclosure, wherein example 15 also includes the subject matter according to any one of examples 1-14, above.

The aggregate of components comprises Sodium Borate. The preceding subject matter of this paragraph characterizes example 16 of the present disclosure, wherein example 16 also includes the subject matter according to any one of examples 1-15, above.

Disclosed herein is a toilet-deposited composition. The decorative tree apparatus toilet-deposited composition includes a water-activated toilet drop-in composition comprising an aggregate of components in solid form including at least one surfactant configured to clean the toilet surfaces, at least one neutralizing agent configured to neutralize urine, a fragrant agent configured to produce a fragrance when deposited in the water, and at least one sterilizing agent. The water-activated toilet drop-in is configured to be deposited in a bowl of a toilet. The preceding subject matter of this paragraph characterizes example 17 of the present disclosure.

The aggregate of components in solid form comprises Potassium Iodide, Sodium Bicarbonate, and Sodium Cocoyl Isethionate. The preceding subject matter of this paragraph characterizes example 18 of the present disclosure, wherein example 18 also includes the subject matter according to example 17, above.

Disclosed herein is a toilet-deposited composition. The toilet-deposited composition includes a water-activated toilet drop-in composition comprising an aggregate of components in solid form including at least one surfactant configured to clean the toilet surfaces, at least one neutralizing agent configured to neutralize urine, a fragrant agent configured to produce a fragrance when deposited in the water, and at least one sterilizing agent. The water-activated toilet drop-in is configured to be deposited in a tank of a toilet. The preceding subject matter of this paragraph characterizes example 19 of the present disclosure.

The aggregate of components in solid form comprises Potassium Iodide, Sodium Lauroyl Isethionate, and Sodium Cocoyl Isethionate. The preceding subject matter of this paragraph characterizes example 20 of the present disclosure, wherein example 20 also includes the subject matter according to example 19, above.

BRIEF DESCRIPTION OF DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered limiting of its scope, the subject matter will be described and explained with additional specificity and detail through the use of the drawings.

Figure 1:
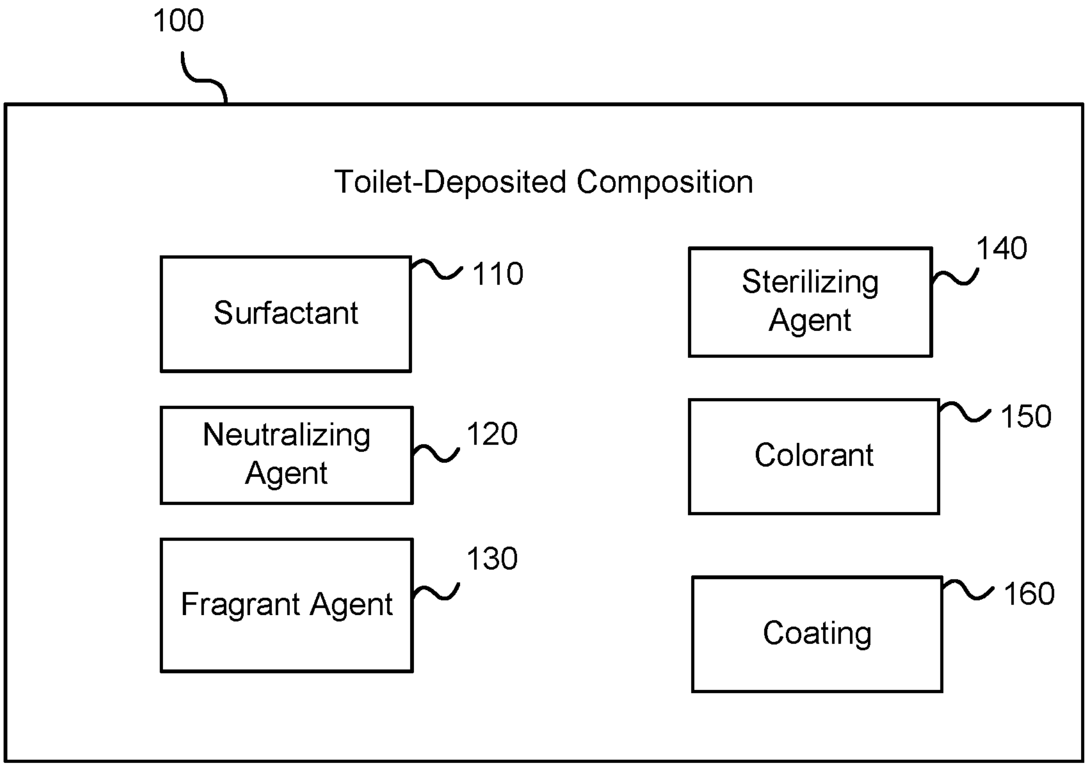
FIG. 1 depicts a schematic diagram of a toilet-deposited composition according to one or more embodiments of this disclosure.

Throughout the description, similar reference numbers may be used to identify similar elements. Throughout this application, similar designations or vocabulary may be used to identify similar elements, although the breadth of this disclosure should be understood to incorporate any alternatives and variations referenced within the specification (including the claims) and the accompanying drawings.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

The expression "configured to" as used herein may be used interchangeably with "suitable for," "having the capacity to," "designed to," "adapted to," "made to," or "capable of" according to a context. The term "configured" does not necessarily mean "specifically designed to" at a hardware level. Instead, the expression "apparatus configured to . . . " may mean that the apparatus is "capable of . . . " along with other devices or parts in a certain context.

While many embodiments are described herein, at least some of the described embodiments include a toilet-deposited composition. The toilet-deposited composition includes a water-activated toilet drop-in composition comprising an aggregate of components in solid form including at least one surfactant configured to clean the toilet surfaces, at least one neutralizing agent configured to neutralize urine, a fragrant agent configured to produce a fragrance when deposited in the water, and at least one sterilizing agent. The water-activated toilet drop-in is configured to be deposited in a bowl or a tank of a toilet.

In some embodiments, the toilet-deposited composition apparatus includes a water-activated toilet drop-in composition comprising an aggregate of components in solid form including at least one surfactant configured to clean the toilet surfaces, at least one neutralizing agent configured to neutralize urine, a fragrant agent configured to produce a fragrance when deposited in the water, and at least one sterilizing agent. The water-activated toilet drop-in is configured to be deposited in a bowl or a tank of a toilet.

Water waste associated with toilets is a significant environmental concern, particularly with inefficient or older toilets that many people use. Traditional toilets can use a substantial amount of water with each flush, contributing to unnecessary water consumption. In regions facing drought conditions or general water scarcity, unnecessary water consumption can become even more critical. With millions of households using these toilets daily, and a standard toilet using up to several gallons of water for each flush, the cumulative impact on water resources can be substantial. This may be compounded by the inefficiency of outdated toilet models, which may cause strains on local water supplies and may also lead to increased energy consumption in water treatment plants, further amplifying the environmental footprint.

Promoting the widespread adoption of these water-saving technologies is crucial for mitigating water waste associated with toilets. To accomplish water-saving, many people simply do not flush the toilet when they have only urinated. However, this can be detrimental to toilet cleanliness and may leave unpleasant odors in a bathroom. For this, many people use aerosol sprays to keep a fresh smell in the bathroom. However, aerosol sprays, while convenient, may pose environmental risks and potentially health risks. Many sprays use harmful ingredients and additionally use traditional propellants that that may be detrimental. Many traditional aerosol products use chlorofluorocarbons (CFCs) or hydrochlorofluorocarbons (HCFCs) as propellants. These propellants have been identified as ozone-depleting substances. Ozone depletion allows more harmful ultraviolet (UV) radiation from the sun to reach the Earth's surface which can have harmful effects. Such environmental consequences may not be worth it to someone just trying to conserve water by not flushing.

Embodiments described herein allow for users to not flush but keep their toilet bowl clean and fresh but utilizing a toilet-deposited composition that can be deposited into a toilet bowl or into the tank of the toilet. The toilet bowl deposited drop-in is temporary as it will be discarded at the next flush of the toilet but allows for a user to urinate at night or during the day and not need to flush the toilet. In addition to conserving water, this also can reduce noise at night so as to not wake a partner with a noisy flush of the toilet.

Embodiments described herein also utilize a toilet-deposited composition that can be deposited into the tank of the toilet. The tank toilet-deposited composition is a more long-term solution as it will not be discarded during flushing of the toilet. The tank toilet-deposited composition may be coupled to or otherwise connected to the tank of the toilet so as to be retained in the tank and slowly release the components of the composition from the tank into the bowl. This allows for the bowl to be refreshed over time and after each flush of the toilet.

While many of the components of the tank deposited composition may be similar to the bowl deposited composition, the tank deposited composition may be configured and designed to release the constituent components more slowly, allowing for the tank deposited composition to last a month or more depending on the size and composition of the tank deposited composition.

In an illustrative example, a bowl deposited composition is an aggregate of components in solid form. The solid form may be of any shape (noting that the total diameter will be less than the diameter of the piping of the house). In this illustrative example, the bowl deposited composition includes the following by percent weight:

| | | |
|---|---|---|
| Citric Acid | 0.00% | +/−3% |
| Colorant | 4.00% | +/−3% |
| Floral Fragrance | 6.00% | +/−5% |
| Sodium Cocoyl Isethionate | 10.00% | +/−5% |
| Sodium Bicarbonate | 56.00% | +/−5% |
| Potassium iodide | 2.00% | +/−1% |
| Water | 10.00% | +/−1% |
| Sugar | 1.00% | +/−3% |
| Kaolin Clay | 1.00% | +/−3% |
| Witch Hazel | 8.00% | +/−1% |
| Polyethylene Glycol | 2.00% | +/−5% |

In an illustrative example, a bowl deposited composition is an aggregate of components in solid form. The solid form may be of any shape (noting that the total diameter will be less than the diameter of the piping of the house). In this illustrative example, the bowl deposited composition includes the following by percent weight:

| | | |
|---|---|---|
| Sodium Lauroyl Lactylate | 63.50% | +/−10% |
| Sodium Cocoyl Isethionate | 5.50% | +/−5% |
| Fragrance | 10.00% | +/−5% |
| Potassium Iodide | 2.00% | +/−1% |
| Lactic Acid | 4.00% | +/−3% |
| Pine Tar | 0.00% | +/−1% |
| Colorant | 7.00% | +/−1% |
| Kaolin Clay | 0.00% | +/−3% |
| Cetearyl Alcohol (Or Stearic Acid) | 8.00% | +/−5% |

In some embodiments, the toilet-deposited composition includes a water-activated toilet drop-in composition comprising an aggregate of components in solid form including at least one surfactant configured to clean the toilet surfaces, at least one neutralizing agent configured to neutralize urine, a fragrant agent configured to produce a fragrance when deposited in the water, and at least one sterilizing agent. The water-activated toilet drop-in is configured to be deposited in a bowl or a tank of a toilet.

Referring to FIG. 1, a schematic diagram of a toilet-deposited composition 100 is shown. Although the toilet-deposited composition 100 is shown and described with certain components and functionality, other embodiments of the toilet-deposited composition 100 may include fewer or more components to implement less or more functionality.

In some embodiments, aspects of toilet-deposited composition 100 are implemented via different components. The toilet-deposited composition 100 may include a toilet drop-in composition. The toilet drop-in composition is configured to be water-activated. In this context, water-activated may include dissolution into the water of the toilet which releases the constituent components of the toilet-deposited composition 100. The toilet-deposited composition 100 may include an aggregate of components in a solid form. Various of the components are in solid form to allow for the toilet-deposited composition 100 to release various agents over a period of time. The release of agents over a period of time allows for the toilet-deposited composition 100 to provide benefits over a longer period of time. Having the toilet-deposited composition 100 be a single solid form allows for the benefits of the various components to be enjoyed throughout the life of the toilet-deposited composition 100.

In the illustrated embodiment, the toilet-deposited composition 100 includes various components which are detailed below. While the components are discussed separately, many constituent ingredients may serve and function as more than one component. The toilet-deposited composition 100 includes at least one surfactant 110. In some embodiments, the toilet-deposited composition 100 may include a plurality of surfactants 110. The surfactant 110 may be a component that is intended to help keep the toilet clean. The surfactants 110 once dissolved from the toilet-deposited composition 100 may be diffused through the water adsorbed onto the surfaces of the toilet bowl to aid in cleaning. The surfactants 110 may have hydrophobic and hydrophilic components.

Examples of potential surfactants 110 include, but are not limited to, Lauryl Glucoside, Sodium Lauroyl Lactylate, Sodium Cocoyl Isethionate, and the like.

The toilet-deposited composition 100 includes at least one neutralizing agent 120. In some embodiments, the toilet-deposited composition 100 may include a plurality of neutralizing agents 120. The neutralizing agent 120 may be a component that is intended to neutralize urine within the toilet bowl or otherwise neutralize the pH of the contents of the toilet. The neutralizing agents 120 once dissolved from the toilet-deposited composition 100 may be diffused through the water and aid in neutralizing various substances in the toilet including urine. Examples of potential neutralizing agents 120 include, but are not limited to, Sodium Bicarbonate, Calcium Carbonate, Calcium Hydroxide, Calcium Sulfate, Lactic Acid, Citric Acid, and the like.

The toilet-deposited composition 100 includes at least one fragrant agent 130. In some embodiments, the toilet-deposited composition 100 may include a plurality of fragrant agents 130. The fragrant agent 130 may be a component that is intended to release a fragrance as the toilet-deposited composition 100 is dissolved over time. The fragrant agent 130 once dissolved from the toilet-deposited composition 100 may be diffused through the water and aid in releasing pleasing smells that overcome unpleasant smells including urine in between flushes. Examples of potential fragrant agents 130 include, but are not limited to, mint fragrances such a Eucalypto, *Mentha piperita, Mentha arvensis* leaf oil, *Mentha spicata* oil, or tea tree oil, etc., citrus fragrances such as *Citrus limon* peel oil, orange oil, *schoenanthus* (lemongrass) oil, Ionone Alpha, or Ionone Beta, etc., floral fragrances such as Jasmine, lavender, Neroli, Orris, Osmanthus, or violet leaves, etc., clover, aloe, *eucalyptus*, elderflower, raspberry, lemon *verbena*, Ocean, tangerine citrus, satsuma, tropical, and the like.

The toilet-deposited composition 100 includes at least one sterilizing agent 140. In some embodiments, the toilet-deposited composition 100 may include a plurality of sterilizing agents 140. The sterilizing agent 140 may be a component that is intended to sterilize the toilet surfaces as the toilet-deposited composition 100 is dissolved over time. The sterilizing agent 140 once dissolved from the toilet-deposited composition 100 may be diffused through the water and aid in sterilizing the toilet in between flushes. Examples of potential sterilizing agents 140 include, but are not limited to, Iodine complexes, iodophor complexes, Potassium Iodide, Pine Tar, Tea Tree Oil, Povidone Iodide, and the like.

The toilet-deposited composition 100 includes at least one colorant 150. In some embodiments, the toilet-deposited composition 100 may include a plurality of colorants 150. The colorant 150 may be a component that is intended to color the water as the toilet-deposited composition 100 is dissolved over time. The colorant 150 once dissolved from the toilet-deposited composition 100 may be diffused through the water and aid in coloring the water and urine.

Examples of potential colorants 150 include, but are not limited to, Mica Color, Red Cabbage, Red Apple Skin, *Spirulina* powder, Butterfly pea flower powder, Indigo powder, Blue cornflower petals, Blue *spirulina* extract, Blueberry powder, Elderberry powder, Maqui berry powder, Blue hibiscus powder, Acai berry powder, Blue pea flower powder, blue matcha powder, cabbage powder, blueberry skin powder, blue raspberry powder, blue chamomile powder, lavender powder, blue grape skin powder, blue cornmeal, blueberry leaf powder, black currant powder, blude *Spirulina chlorella* blend, blue algae powder, *Indigofera tinctoria* powder, blueberry extract powder, blue licorice root powder, blue woad powder, blue bilberry powder, blueberry juice powder, blue mulberry powder, purple sweet potato powder, beetroot powder, elderberry powder, blue *spirulina* extract, purple corn flour, blackberry powder, blueberry powder, hibiscus powder, acai berry powder, maqui berry powder, grape skin powder, black currant powder, purple carrot powder, lavender powder, purple cabbage powder, blue butterfly pea flower powder, black raspberry powder, mulberry powder, plum powder, acai berry powder, black mulberry powder, black goji berry powder, purple cornflower petals, purple sweet potato skin powder, purple yam powder, purple carrot skin powder, lavender beetroot powder blend, purple grape juice powder, lavender blueberry powder blend, purple hibiscus beetroot blend, beetroot powder, alkanet root powder, hibiscus powder, annatto seed powder, Rosehip powder, red raspberry seed powder, red sandalwood powder, goji berry powder, paprika powder, red clay powder, madder root powder, dragonfruit powder, red cabbage powder cranberry powder, pomegranate powder, acai berry powder, cherry powder, red currant powder, tomato powder, goji berry extract, rose petal powder, red beet juice powder, carrot powder, red hibiscus beetroot blend, red dragonfruit beetroot blend, red raspberry hibiscus blend, red currant beetroot blend, red clay hibiscus blend, red cabbage beetroot blend, acai berry hibiscus blend, and the like.

In some embodiments, the toilet-deposited composition 100 includes a coating 160. The coating 160 functions to keep the remainder of the components from transferring to a user's hands when handling or placing the toilet-deposited composition 100 in position. The coating 160 may be a wax or dissolvable plastic. In an illustrative example, the coating 160 is a polyethylene glycol or similar material.

Figure 2:
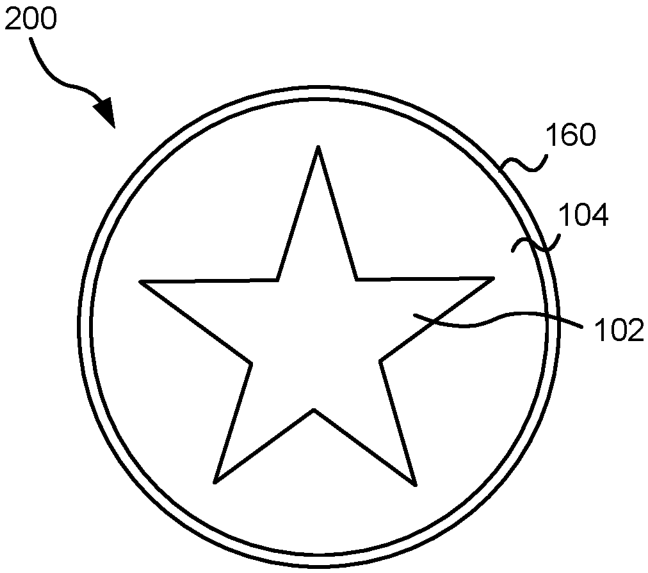
FIG. 2 depicts a side view of a toilet-deposited composition according to one or more embodiments of this disclosure.

Referring now to FIG. 2, a side view of a toilet-deposited composition 100 is shown. Although the toilet-deposited composition 100 is shown and described with certain components and functionality, other embodiments of the toilet-deposited composition 100 may include fewer or more components to implement less or more functionality.

The toilet-deposited composition 100 includes an inner aggregate of components 102, an outer aggregate of components 104, and a coating 160. The inner aggregate of components 102 and the outer aggregate of components 104 may include many of the same ingredients. Such ingredients may be similar to those described above in connection with FIG. 1. The inner aggregate of components 102 and the outer aggregate of components 104 may include less or more components than were discussed above.

In some embodiments, the inner aggregate includes a water-activated toilet drop-in composition comprising an aggregate of components in solid form including at least one surfactant configured to clean the toilet surfaces, at least one neutralizing agent configured to neutralize urine, a fragrant agent configured to produce a fragrance when deposited in the water, and at least one sterilizing agent. The water-activated toilet drop-in is configured to be deposited in a bowl or a tank of a toilet.

In some embodiments, the water-activated toilet drop-in is configured to be deposited in the bowl of the toilet to reduce the need to flush the toilet. In some embodiments, the neutralizing agent comprises sodium bicarbonate. In some embodiments, the surfactant comprises Sodium Cocoyl Isethionate. In some embodiments, the aggregate of components in solid form comprises potassium iodide. In some embodiments, the aggregate of components in solid form further comprises at least one colorant configured to color the water. In some embodiments, the aggregate of components in solid form comprises sodium cocoyl isethionate in a weight percent between 5% and 15%. In some embodiments, the aggregate of components in solid form comprises sodium bicarbonate in a weight percent between 46% and 66%. In some embodiments, the aggregate of components in solid form an inner aggregate of components and an outer aggregate of components, wherein the inner aggregate of components is configured to dissolve at a rate slower than the outer aggregate of components. In some embodiments, the inner aggregate of components comprises a sterilizing agent comprising Potassium Iodide. In some embodiments, the inner aggregate of components comprises Citric Acid.

In some embodiments, the outer aggregate includes a water-activated toilet drop-in composition comprising an aggregate of components in solid form including at least one surfactant configured to clean the toilet surfaces, at least one neutralizing agent configured to neutralize urine, a fragrant agent configured to produce a fragrance when deposited in the water, and at least one sterilizing agent. The water-activated toilet drop-in is configured to be deposited in a bowl or a tank of a toilet.

In some embodiments, the water-activated toilet drop-in is configured to be deposited in the bowl of the toilet to reduce the need to flush the toilet. In some embodiments, the neutralizing agent comprises sodium bicarbonate. In some embodiments, the surfactant comprises Sodium Cocoyl Isethionate. In some embodiments, the aggregate of components in solid form comprises potassium iodide. In some embodiments, the aggregate of components in solid form further comprises at least one colorant configured to color the water. In some embodiments, the aggregate of components in solid form comprises sodium cocoyl isethionate in a weight percent between 5% and 15%. In some embodiments, the aggregate of components in solid form comprises sodium bicarbonate in a weight percent between 46% and 66%. In some embodiments, the aggregate of components in solid form an inner aggregate of components and an outer aggregate of components, wherein the inner aggregate of components is configured to dissolve at a rate slower than the outer aggregate of components. In some embodiments, the inner aggregate of components comprises a sterilizing agent comprising Potassium Iodide. In some embodiments, the inner aggregate of components comprises Citric Acid.

Figure 3:
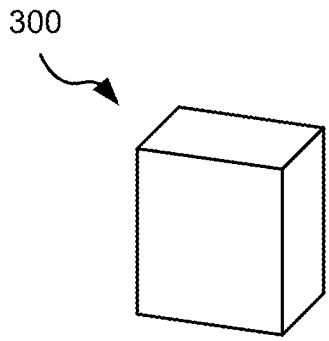
FIG. 3 depicts a tank toilet-deposited composition according to one or more embodiments of this disclosure.

Referring now to FIG. 3, a tank toilet-deposited composition is shown. Although the tank toilet-deposited composition is shown and described with certain components and functionality, other embodiments of the tank toilet-deposited composition may include fewer or more components to implement less or more functionality.

The tank toilet-deposited composition 300 is configured to last longer than the bowl-deposited composition 200 as the tank toilet-deposited composition 300 is configured to last through a large plurality of flushes. The tank toilet-deposited composition 300 has a slower release and is coupled to the tank of the toilet.

In some embodiments, the inner aggregate includes a water-activated toilet drop-in composition comprising an aggregate of components in solid form including at least one surfactant configured to clean the toilet surfaces, at least one neutralizing agent configured to neutralize urine, a fragrant agent configured to produce a fragrance when deposited in the water, and at least one sterilizing agent. The water-activated toilet drop-in is configured to be deposited in a bowl or a tank of a toilet.

In some embodiments, the water-activated toilet drop-in is configured to be deposited in the tank of the toilet. In some embodiments, the surfactant comprises Sodium Lauroyl Lactylate. In some embodiments, the surfactant comprises Pine Tar. In some embodiments, the aggregate of components comprises a sterilizing agent comprising Potassium Iodide. In some embodiments, the aggregate of components comprises Sodium Borate.

Figure 4:
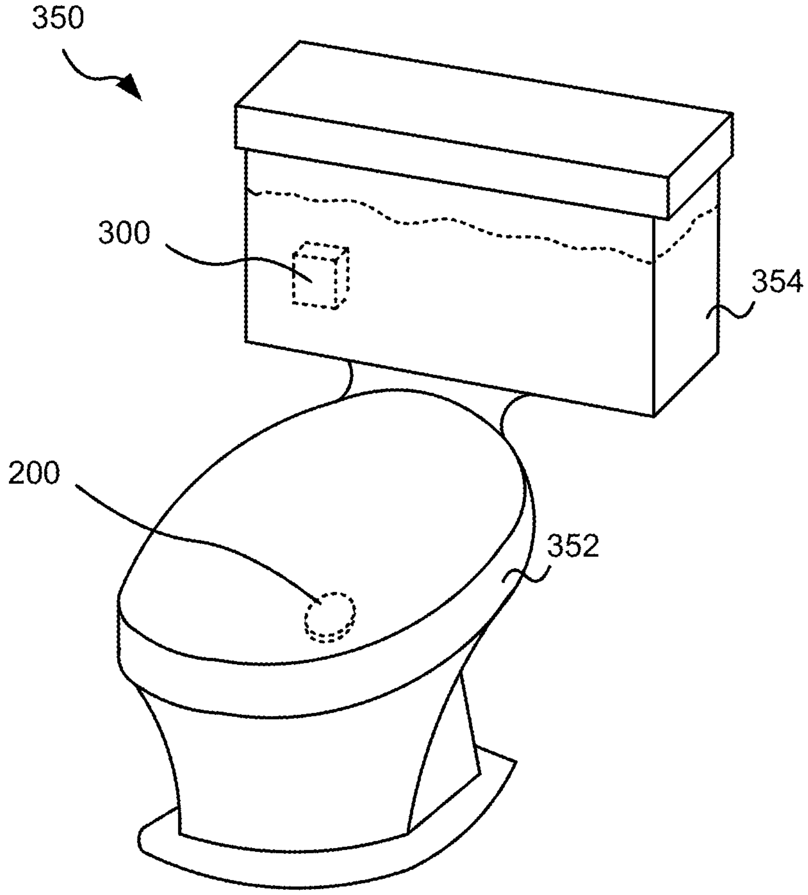
FIG. 4 depicts a perspective view of a toilet with a tank-deposited composition and a bowl-deposited composition according to one or more embodiments of this disclosure.

Referring to FIG. 4, a perspective view of a toilet 350 with a tank-deposited composition 300 and a bowl-deposited composition 200 is shown. The illustrated embodiment shows the compositions in use.

As can be seen, the tank-deposited composition 300 is housed within the tank 354 of the toilet 350. The tank-deposited composition 300 is shown in dashed lines to show that it is located internal to the tank 354. In addition, the bowl-deposited composition 200 is housed within the bowl 352 of the toilet 350. The bowl-deposited composition 200 is shown in dashed lines to show that it is located internal to the bowl 352.

Figure 5:
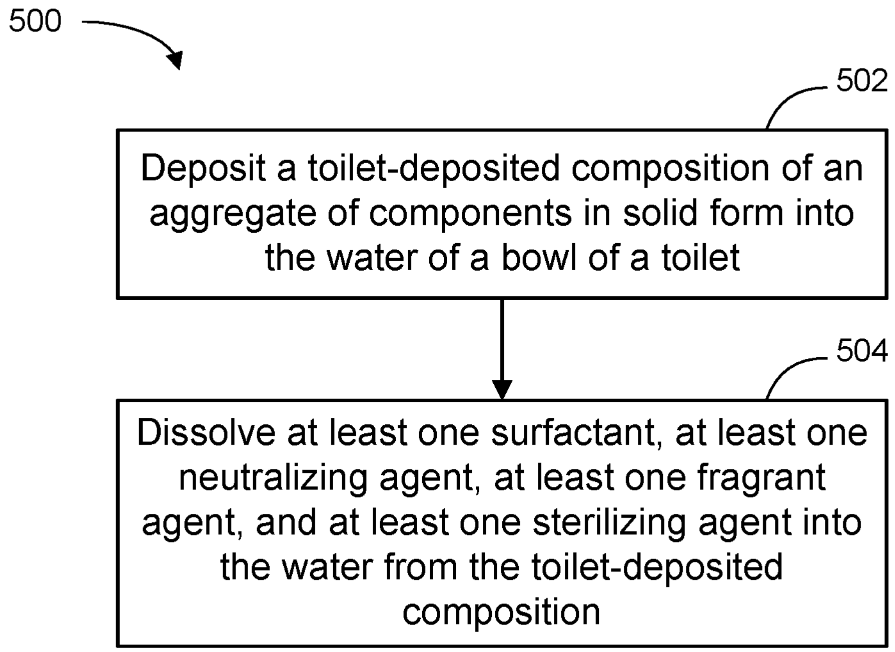
FIG. 5 depicts a schematic flow diagram of a method, according to one or more embodiments of the invention.

FIG. 5 depicts a schematic flow diagram of a method, according to one or more embodiments of the invention. The method 500 includes various steps. More or less steps may be used in other embodiments.

At block 502, the method 500 includes depositing a toilet-deposited composition of an aggregate of components in solid form into the water of a bowl of a toilet. At block 504, the method 500 includes dissolving at least one surfactant, at least one neutralizing agent, at least one fragrant agent, at least one sterilizing agent into the water from the toilet-deposited composition. The method 500 then ends.

Figure 6:
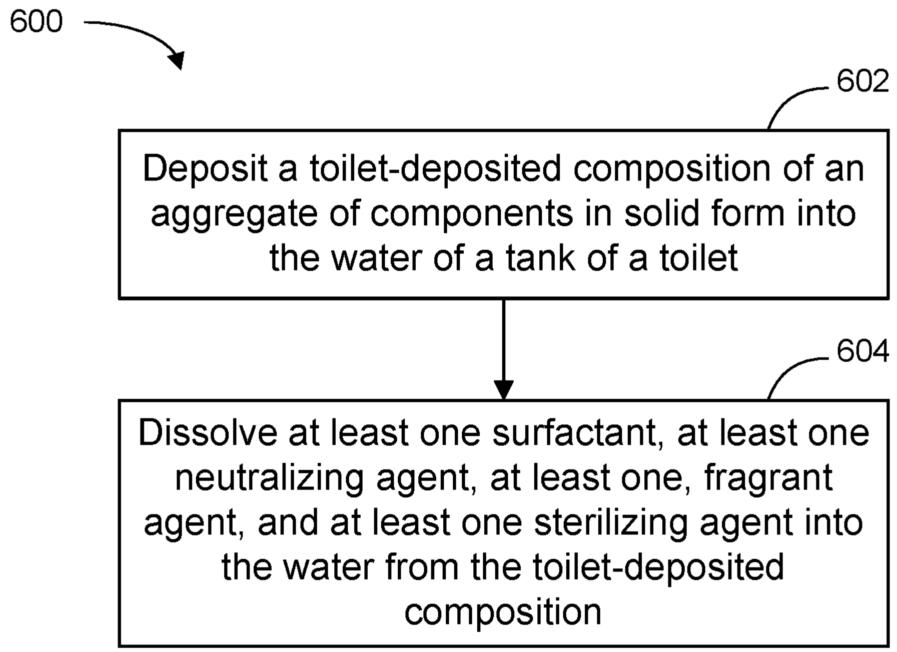
FIG. 6 depicts a schematic flow diagram of a method, according to one or more embodiments of the invention.

FIG. 6 depicts a schematic flow diagram of a method, according to one or more embodiments of the invention. The method 600 includes various steps. More or less steps may be used in other embodiments.

At block 602, the method 600 includes depositing a toilet-deposited composition of an aggregate of components in solid form into the water of a tank of a toilet. At block 604, the method 600 includes dissolving at least one surfactant, at least one neutralizing agent, at least one fragrant agent, at least one sterilizing agent into the water from the toilet-deposited composition. The method 600 then ends.

Figure 7:
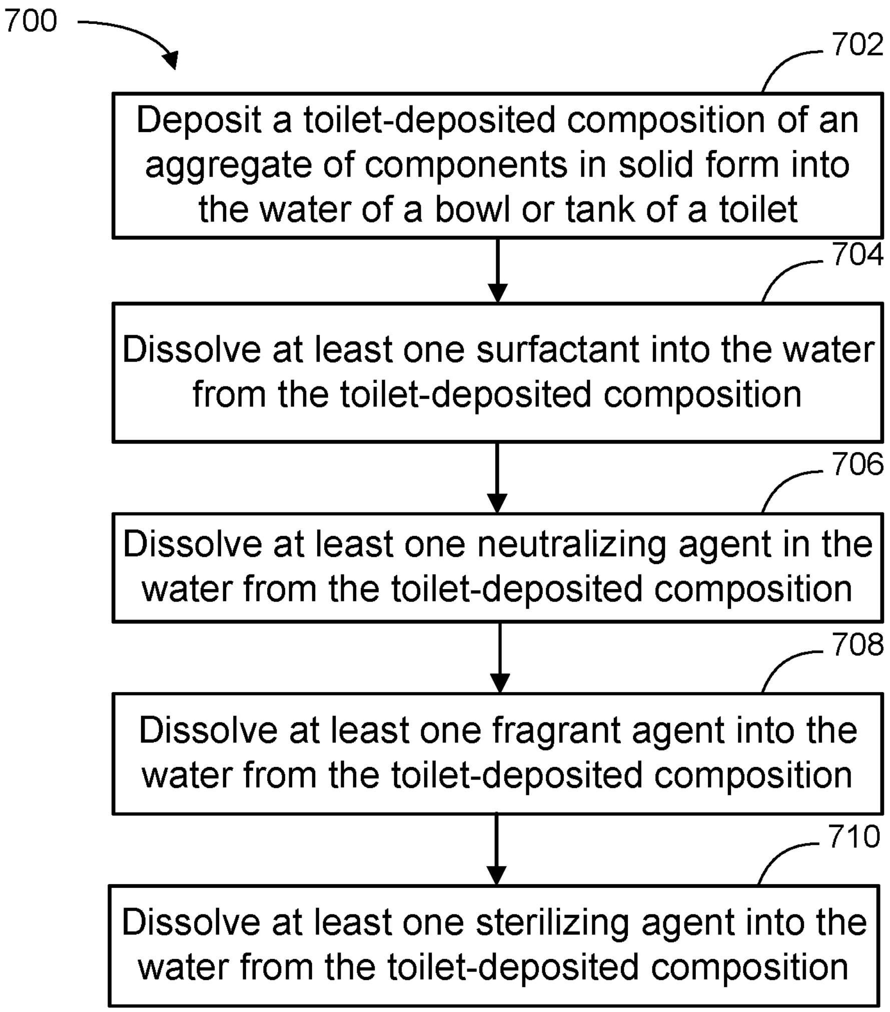
FIG. 7 depicts a schematic flow diagram of a method, according to one or more embodiments of the invention.

FIG. 7 depicts a schematic flow diagram of a method, according to one or more embodiments of the invention. The method 700 includes various steps. More or less steps may be used in other embodiments.

At block 702, the method 700 includes depositing a toilet-deposited composition of an aggregate of components in solid form into the water of a bowl or tank of a toilet. At block 704, the method 700 includes dissolving at least one surfactant into the water from the toilet-deposited composition. At block 706, the method 700 includes dissolving at least one neutralizing agent into the water from the toilet-deposited composition. At block 708, the method 700 includes dissolving at least one fragrant agent into the water from the toilet-deposited composition. At block 710, the method 700 includes dissolving at least one sterilizing agent into the water from the toilet-deposited composition. The method 700 then ends.

Although the operations of the method(s) or processes herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

What is claimed is:

1. A toilet-deposited composition, the composition comprising a water-activated toilet drop-in composition comprising an aggregate of components in solid form comprising:

A) at least one surfactant configured to clean the toilet surfaces;

B) at least one urine neutralizing agent configured to neutralize urine;

C) a fragrant agent configured to produce a fragrance when deposited in the water;

D) at least one sterilizing agent;

E) potassium iodide; and

F) pine tar, wherein the solid composition is configured to be deposited in the bowl or the tank of a toilet.

2. The toilet-deposited composition of claim 1, wherein the water-activated toilet drop-in is configured to be deposited in the bowl of the toilet to reduce the need to flush the toilet.

3. The toilet-deposited composition of claim 2, wherein the urine neutralizing agent comprises sodium bicarbonate.

4. The toilet-deposited composition of claim 2, wherein the surfactant comprises Sodium Cocoyl Isethionate.

5. The toilet-deposited composition of claim 2, wherein the aggregate of components in solid form further comprises at least one colorant configured to color the water.

6. The toilet-deposited composition of claim 4, wherein the aggregate of components in solid form comprises sodium cocoyl isethionate in a weight percent between 5% and 15%.

7. The toilet-deposited composition of claim 3, wherein the aggregate of components in solid form comprises sodium bicarbonate in a weight percent between 46% and 66%.

8. The toilet-deposited composition of claim 2, wherein the aggregate of components in solid form comprises an inner aggregate of components and an outer aggregate of components, wherein the inner aggregate of components is configured to dissolve at a rate slower than the outer aggregate of components.

9. The toilet-deposited composition of claim 8, wherein the inner aggregate of components further comprises Citric Acid.

10. The toilet-deposited composition of claim 1, wherein the water-activated toilet drop-in is configured to be deposited in the tank of the toilet.

11. The toilet-deposited composition of claim 10, wherein the surfactant comprises Sodium Lauroyl Lactylate.

12. The toilet-deposited composition of claim 10, wherein the aggregate of components comprises further Sodium Borate.

13. A toilet-deposited composition, the composition comprising a water-activated toilet drop-in composition comprising an aggregate of components in solid form comprising:

A) at least one surfactant configured to clean the toilet surfaces;

B) at least one urine neutralizing agent configured to neutralize urine selected from the group consisting of sodium bicarbonate, calcium carbonate, calcium hydroxide, calcium sulfate, or lactic acid;

C) a fragrant agent configured to produce a fragrance when deposited in the water;

D) at least one sterilizing agent;

E) potassium iodide; and

F) pine tar, wherein the solid composition is configured to be deposited in the bowl or the tank of a toilet.

14. The toilet-deposited composition of claim 13, wherein the aggregate of components in solid form comprises the potassium iodide and a mixture of sodium lauroyl isethionate and sodium cocoyl isethionate as the surfactant component.

* * * * *